US011525895B2

(12) United States Patent
Yatskan et al.

(10) Patent No.: US 11,525,895 B2
(45) Date of Patent: Dec. 13, 2022

(54) DETECTING SYSTEM FOR DETECTING DISTANT OBJECTS

(71) Applicant: NewSight Imaging Ltd., Ness Ziona (IL)

(72) Inventors: Eyal Yatskan, Modiin (IL); Nadav Haas, Merkaz Shapira (IL)

(*) Notice: Subject to any disclaimer, the term of this patent is extended or adjusted under 35 U.S.C. 154(b) by 819 days.

(21) Appl. No.: 16/234,622

(22) Filed: Dec. 28, 2018

(65) Prior Publication Data

US 2019/0204422 A1 Jul. 4, 2019

Related U.S. Application Data

(60) Provisional application No. 62/611,252, filed on Dec. 28, 2017.

(51) Int. Cl.
| | |
|---|---|
| *G01S 7/481* | (2006.01) |
| *G01S 17/02* | (2020.01) |
| *G01S 7/486* | (2020.01) |
| *G01S 17/10* | (2020.01) |
| *G01S 7/499* | (2006.01) |
| *G01S 17/04* | (2020.01) |

(52) U.S. Cl.
CPC .......... *G01S 7/4816* (2013.01); *G01S 7/4815* (2013.01); *G01S 7/4868* (2013.01); *G01S 7/499* (2013.01); *G01S 17/04* (2020.01); *G01S 17/10* (2013.01)

(58) Field of Classification Search
CPC .... G01S 7/4868; G01S 7/4816; G01S 7/4815; G01S 17/04; G01S 7/499; G01S 17/10

USPC ........................................................ 356/4.01
See application file for complete search history.

(56) References Cited

U.S. PATENT DOCUMENTS

| 4,011,445 A * | 3/1977 | O'Meara | G01S 7/499 |
| | | | 398/205 |
| 9,303,989 B2 * | 4/2016 | Nehmadi | G01C 11/06 |
| 2019/0041519 A1 * | 2/2019 | Spickermann | G01S 17/93 |

OTHER PUBLICATIONS

"Polarization by Absorption," Harvard Natural Science Lecture Demonstrations, downloaded Sep. 5, 2021 from https://sciencedemonstrations.fas.harvard.edu/presentations/polarization-absorption, 3 pages. (Year: 2021).*
Kadri et al., Student activity: verification on Malus's law of polarization at low cost, 10 pages (Year: 2013).*

* cited by examiner

*Primary Examiner* — Daniel L Murphy
(74) *Attorney, Agent, or Firm* — Patshegen IP; Moshe Pinchas

(57) ABSTRACT

A detecting system is provided for detecting distant objects. The system includes a light source configured to emit light pulses towards a distant object, the light pulses are being polarized at a predefined polarization angle; a detector configured to detect at least a portion of the light pulses reflected from the distant objects; and at least one linear polarizer configured for polarizing light at the polarization angle and being so disposed with respect to the detector such that the light reaching the detector passes through the linear polarizer and is polarized at the polarization angle.

10 Claims, 2 Drawing Sheets

DETECTING SYSTEM FOR DETECTING DISTANT OBJECTS

FIELD OF INVENTION

The presently disclosed subject matter relates to a detecting system for detecting distant objects, in general, and in particular to a range detector for assessing distance of objects.

BACKGROUND

Vehicle autonomy and driver assistance systems rely on the ability to detect objects at various distances with respect to the vehicle, to determine the distance between the vehicle and the object, and to identify the objects such as identifying pedestrians and cyclists, motor vehicles, side strips, bridge abutments, and road margins, etc.

Light Detection and Ranging systems (LiDAR) are one of the technologies which are used in autonomous vehicles for assessing distances. In the LiDAR systems a target is illuminated with a pulsed laser light, and the reflected pulse is measured.

As shown in FIG. 1, the LiDAR system is configured to send out light pulses, having a pulse time slot 10 such as a 50 nm pulse, the readout of the detector is carried out at the end of the 50 ns pulse time slot 10. In addition, the detector can be configured to control the exposure time of the detector, for example by using a shutter. This way, the detector can be configured to allow capturing light within a capturing time slot 14, which can be synchronized with the pulse time slot 10, such that the pulse is sent and at the very same time the detector is available to capture the light reflecting from distant objects.

Due to the time of flight of the pulse, however, the reflected pulse 12 reaches the detector with a delay with respect to the pulse time slot 10 and capturing time slot 14. Consequently, only a front section 12a of the reflected pulse 12 reaches the detector, before the end of the capturing time slot 14, and the back section 12b of the reflected pulse 12, is not read by the detector, or at least is not read within the capturing time slot 14.

Accordingly, the distance can be calculated using the equation, $$D = \frac{1}{2} c \; t_0 \frac{s_2}{s_1 + s_2}$$

for an ideal detector, where c is the speed of light; $t_0$ is the pulse width; i.e., the pulse duration; $S_1$ is the amount of the light of the front section 12a of the reflected pulse 12, i.e., the amount of light which is received by the detector at the pulse timeslot 10, and capturing time slot 14; and $S_2$ is the amount of the light within the back section 12b of the reflected pulse 12, i.e., the amount of light which is not read by the detector, or at least is not read within the capturing time slot 14.

The above distance calculating equation requires however also the $S_2$ component of the reflected pulse 12, i.e., the back portion 12b of the light pulse which did not reach the detector within the pulse timeslot 10 and the capturing time slot 14. Thus, following the initial readout of the detector at the end of the pulse timeslot, a second readout can be carried out after a predetermined time period, i.e., timeslot which can be a 50 ns time slot, following the end of the capturing time slot 14. The second readout provides the data related to the back portion 12b of the light pulse, i.e., the portion of the light which did not make it to the detector during the 50 ns time slot. This way, the two readouts provide both components of the reflected pulse 12 $S_1$ and $S_2$, and the distance of the object can be calculated with the above equation.

Since the above calculation, depends on accurate detection of light reflected from the pulse sent by the laser, one of the challenges in using a LiDAR system or similar technologies is the ambient light, which is detected by the detector and interferes with object detections. One solution for this problem is utilizing an optical filter for filtering any light having a wavelength different than the wavelength of the light pulses sent by the laser of the LiDAR system, such that the only light entering the detector is the reflected laser pulse.

Obviously, the filtering solution does not eliminate light having the same wavelength as the light pulse. Hence, in case similar light pulses are emitted from other autonomous vehicles making use of the LiDAR technology, the detector of a first vehicle may falsely detect light emitted by a LiDAR system of a second vehicle. This issue results in malfunction of the detector or false detection of objects.

SUMMARY OF INVENTION

There is provided in accordance with an aspect of the presently disclosed subject matter a detecting system for detecting distant objects. The system includes a light source configured to emit light pulses towards a distant object, the light pulses being polarized at a predefined polarization angle; a detector configured to detect at least a portion of the light pulses reflected from the distant objects; and at least one linear polarizer configured for polarizing light at the polarization angle and being so disposed with respect to the detector such that the light reaching the detector passes through the linear polarizer and is polarized at the polarization angle.

The light pulses can be polarized such that when passing through the linear polarizer towards the detector the polarization thereof is maintained.

The linear polarizer can be configured to absorb at least a portion of unpolarized light radiation and light radiation having polarization angle different than the predefined polarization angle.

The linear polarizer can be configured to attenuate unpolarized light radiation and light radiation having polarization angle different than the predefined polarization angle.

The light pulses can define a signal detected by the detector, and light other than the light pulse can define a noise detected by the detector, and wherein the linear polarizer is configured to at least partially filter the other light and to increase a ratio between the signal and the noise.

The linear polarizer can be configured to fully absorb light waves vibrating with respect to a plane orthogonal to the predefined polarization angle and to partially absorb light waves vibrating with respect to planes having an angle larger than 0° and smaller than 90° with respect to the predefined polarization angle.

The predefined polarization angle can be 45° in a first direction with respect to the horizon such that light radiation polarized at an angle of 45° in an opposite direction is completely blocked by the linear polarizer.

The linear polarizer can be configured to change a polarization angle thereof and wherein the light source can be configured to change the polarization angle of the light pulse. The detecting system can further include a controller configured for selectively determine the polarization angle. The controller can be configured to change the polarization angle is response to saturation of the detector.

The detecting system can further include a second light source and a second detector and a second linear polarizer, and wherein the second light source is configured to emit light pulses polarized at a second polarization angle, and wherein the second linear polarizer is configured for polarizing light at the second polarization angle and wherein the second polarization angle is 45° in the opposite direction with respect to the horizon.

The difference between the polarization angle of the first light source and the second polarization angle of the second light source can be 90°. The detecting system can further include a controller configured to activate the second light source in response to saturation of the detector. The detecting system can further include a controller configured to detect light pulses reflecting from the distant objects by summing up the detection of the detector and the second detector.

There is provided in accordance with another aspect of the presently disclosed subject matter a method for detecting distant objects. The method includes transmitting light pulses from a light source towards a distant object, the light pulses being polarized at a predefined polarization angle; detecting with a detector at least a portion of the light pulses reflected from the distant objects; and, filtering light entering the detector with at least one linear polarizer configured for polarizing the light at the polarization angle.

BRIEF DESCRIPTION OF THE DRAWINGS

In order to understand the disclosure and to see how it may be carried out in practice, embodiments will now be described, by way of non-limiting examples only, with reference to the accompanying drawings, in which.

DETAILED DESCRIPTION OF EMBODIMENTS

Figure 1:
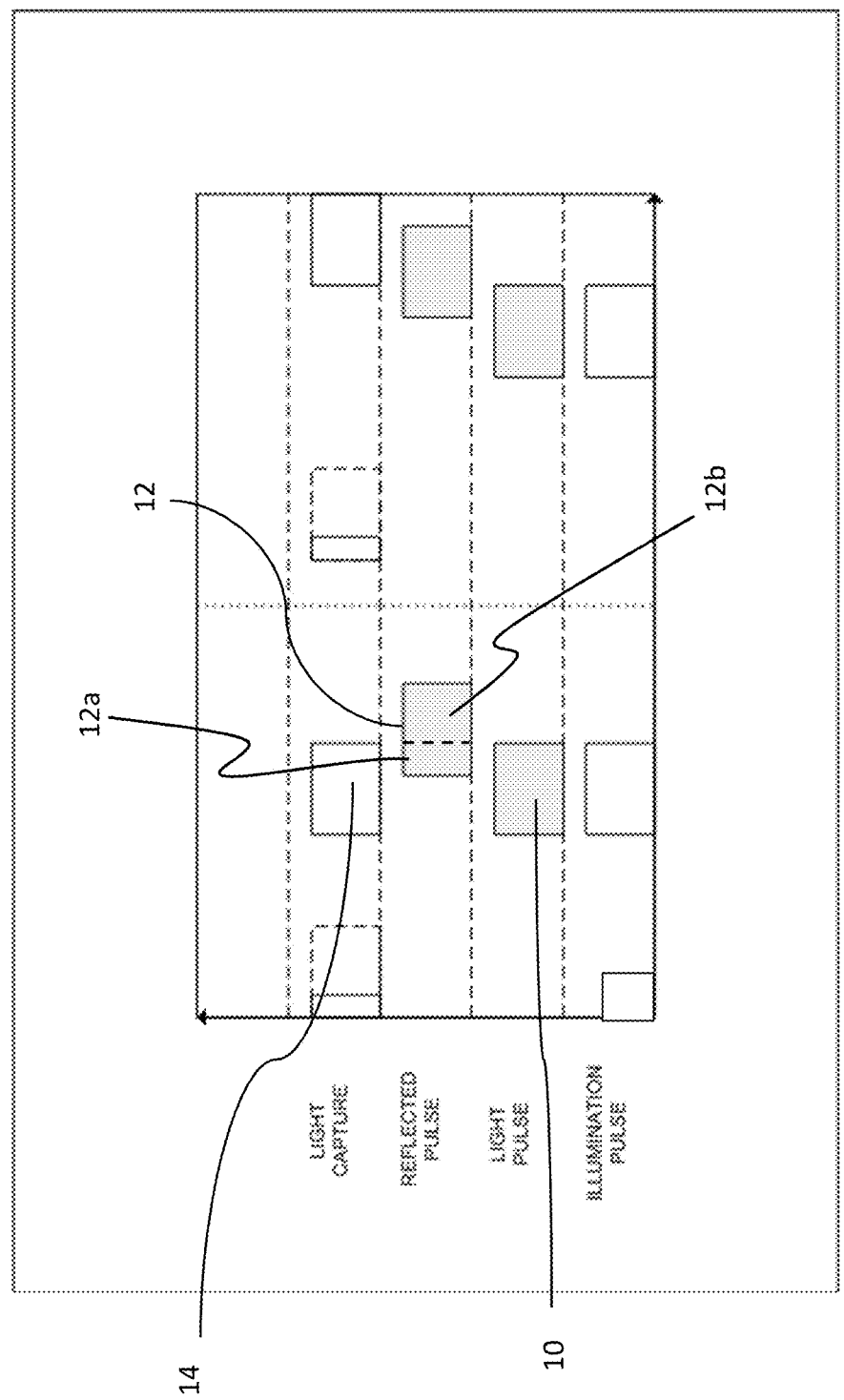
FIG. 1 is a is a graph illustration of a prior art timing diagram of time-of-flight reflected light detection.
Figure 2:
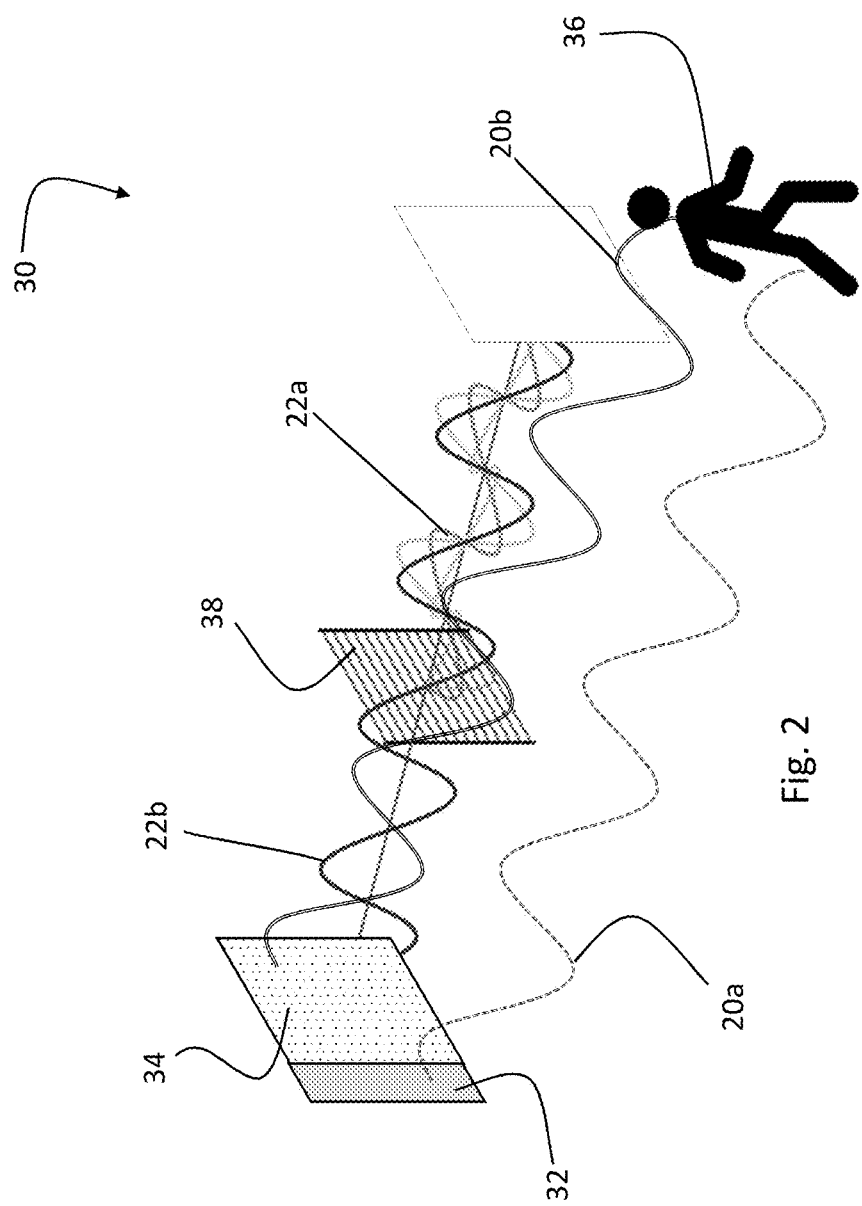
FIG. 2 is a schematic illustration of a detecting system constructed and operative in accordance with an example of the presently disclosed subject matter.

FIG. 2 is a schematic illustration of the detecting system 30 in accordance with an example of the presently disclosed subject matter. The detecting system 30 includes a light source 32 configured to emit polarized light pulses 20a, for example for detecting distances of objects ahead of the detecting system 30. The detecting system 30 further includes a detector 34 configured to detect at least a portion of the light pulses reflected from distant objects 36, here designated as reflected pulse 20b.

The detecting system 30 further includes a linear polarizer 38 configured for polarizing light passing therethrough at a predefined direction, such that vibrations of the polarized light occur in a single plane. The linear polarizer 38 is disposed with respect to the detector 34 such that the any light passes through the linear polarizer 38 before reaching the detector 34. The linear polarizer 38 is configured to polarize light at a substantial same polarization as the polarization of the light pulses 20a emitted from the light source 32.

This way, when the reflected pulse 20b, which is the reflection of the polarized light pulses 20a, passes through the linear polarizer 38 towards the detector 34, the reflected pulse 20b maintains the same polarization, and fully passes through the linear polarizer 38. Unpolarized light 22a emitted from light sources other than the light source 32, such as light emitted from the ambient, passes through the linear polarizer 38 and is modified to a polarized light 22b. As a result of the polarization modification of the unpolarized light 22a, the intensity of the unpolarized light 22a is reduced, since any portions of the light which are not polarized is proportionally blocked or at least attenuated.

Consequently, while the reflected pulse 20b reaches the detector 34 without the intensity thereof being reduced by the linear polarizer 38, the intensity of the ambient light 22a is reduced by the effect of the linear polarizer 38. This way, the signal to noise ratio is improved, and the accuracy of the detecting system 30 is increased.

In the illustration of FIG. 2, for sake of clarity, the linear polarizer 38 is illustrated as being disposed away from the detector 34. In practice, however, the linear polarizer 38 can be disposed in close proximity to the detector 34, such that substantially no light can reach the detector 34 without passing through the linear polarizer 38. This way, ambient light or other light radiation, which is not polarized at a polarization angle corresponding to the polarization angle of the linear polarizer 38, is substantially blocked or attenuated by the linear polarizer 38. As a result, in case of a light pulse which is emitted from a LiDAR device of another vehicle, if the light pulse emitted from the other vehicle is not polarized at an angle corresponding to the linear polarizer 38, the light pulse of the other vehicle will be substantially blocked.

It is appreciated that the linear polarizer 38 does not block out all the light which is not polarized at the same polarization angle, rather the linear polarizer 38 blocks only light waves vibrating with respect to a plane orthogonal to the angle of the linear polarizer 38. I.e. light waves vibrating with respect to a plane which is 90° rotated with respect to the polarization angle of the linear polarizer 38 is completely blocked by the linear polarizer 38 while light waves vibrating with respect to other planes are only partially blocked.

Accordingly, in order to effectively block light pulses emitted from a LiDAR device of other vehicles, the linear polarizer 38 can be configured to polarize the light pulse at a polarization angle of 45° with respect to the horizon. This way, if two vehicles having a similar LiDAR device as described herein, when a first vehicle emits light ahead of the first vehicle, and a second vehicle, driving in an opposite direction, emits light ahead of the second vehicle, the light emitted by the second vehicle is directed towards the LiDAR device of the first vehicle. Hence, if all the vehicles emit polarized light at a polarization angle of 45° with respect to the horizon, when the first and second vehicles are driving towards one another, the difference between the polarization angle of the first vehicle and the polarization angle of the second vehicle is 90°. Consequently, the polarized light of one vehicle is substantially completely blocked by the linear polarizer 38 of the opposite vehicle. It is appreciated that such condition can be obtained by establishing regulations according to which range detectors installed on the front of all vehicles must include a linear polarizer having a polarization angle of 45°.

In the latter case, if two vehicles drive on two opposite lanes, however not precisely along two parallel lines, such as when driving along a curved road, some of the light emitted by a range detector of one vehicle reaches the linear polarizer 38 of the opposite vehicle at an angle which is not 90° with respect to the angle of the linear polarizer 38. In this case, some of the light of the first vehicle will pass through the linear polarizer of the opposite vehicle. This light however, is a small fraction of the light which is emitted, since the intensity of light which passes through the linear polarizer depends on the square of the cosine of the difference between the polarization angle of the light and the polarization angle of the linear polarizer.

Similarly, when a vehicle includes a front and a rear detecting system, the front system of a first vehicle may be interfered by a rear system of a second system. Thus, the front detecting system of the first vehicle can include a linear polarizer having a polarization angle of 45° in a first direction, and the rear detecting system of the second vehicle can include a linear polarizer having a polarization angle of 45° in a second direction. This way, the total difference between the polarization angle of the front system of the first vehicle and the polarization angle of the rear system of the second vehicle is 90°. Consequently, the polarized light of the rear system is substantially completely blocked by the linear polarizer of the front system.

As explained hereinabove, according to the illustrated example the detecting system 30 includes a single linear polarizer 38 so disposed with respect to the light source 32 and the detector 34 such that the linear polarizer 38 polarizes the light emitted from light source 32 and at the same time also blocks reflected light which is not polarized at the selected polarization angle.

It will be appreciated that the use of a linear polarizer also mitigates the effect of ambient light, since only the portion of the ambient light which vibrates on a plane disposed at an angle corresponding to the linear polarizer reaches the detector. Accordingly, the linear polarizer also serves as an ambient light filter.

According to an example of the presently disclosed subject matter, the linear polarizer can be configured to change the polarization angle, such as by rotating about an axis parallel to the optical axis of the light source, or by using other electronic means for setting polarization angle. This way, the detecting system can be configured to emit light at a certain polarization angle, and to detect reflected light having the same polarization angle. In case the directed illumination impinges on the detector, such as light pulses from a second vehicle having same polarization angle as that of the polarizer of the first vehicle, the linear polarizer is slightly rotated changing thereby the polarization angle thereof. This way, the light emitted by the second vehicle is no longer at the same polarization angle as that of the first vehicle, and is consequently partially blocked by the polarizer of the first vehicle. The detecting system can thus include a controller for selectively rotating the linear polarizer, or changing the polarization angle to the required angle.

It is appreciated that the detecting system can be configured to differentiate between a reflected light, which is the light pulse reflected by an object and a directed light which is the light pulse of another vehicle. Such differentiating is possible since in the case of direct light impinging on the detector, the detector reaches saturation due to the high intensity of the direct light, this is as opposed to the relatively low intensity of the reflected light. Thus, the controller of the detecting system can be configured such that when the detector reaches saturation, the linear polarizer is automatically rotated changing thereby the polarization angle thereof, such that the directed light which is polarized at a certain angle is no longer aligned with the linear polarizer.

According to another example of the presently disclosed subject matter, the detecting system can include two sets of a light source and a detector, each set provided with linear polarizer. The first light source of the first set is configured to emit polarized light at a polarization angle of 45° with respect to the horizon in a first direction, while the second light source of the second set is configured to polarize light at a polarization angle of 45° with respect to the horizon in an opposite direction. Similarly, the first linear polarizer of the first set is configured to polarize light at a polarization angle of 45° with respect to the horizon in a first direction, while the second set is configured to polarize light at a polarization angle of 45° with respect to the horizon in an opposite direction. This way, the difference between the polarization angle of the first set and the polarization angle of the second set is 90°.

The detecting system according to this example can be configured to normally detect with both sets, i.e., the first set emits light pulses polarized at a first polarization angle and configured to detect light at a same first polarization angle and to attenuate any light which is not polarized at a first polarization angle. The second set emits light pulses polarized at a second polarization angle and configured to detect light at same second polarization angle and to attenuate any light which is not polarized at a first polarization angle. When a first detector reaches saturation, i.e., directed illumination of another vehicle interferes the operation of that detector, the controller of the detecting system can be configured to eliminate the detection result of the first detector and to base the detection result solely on the second detector. Since, as stated hereinabove, the difference between the polarization angle of the first set and the polarization angle of the second set is 90°, when a detector of one set reaches saturation due to direct light polarized at the same angle, the second set substantially blocks the direct light.

According to an example, the two sets can normally operate such that the detection thereof is summed up, increasing thereby the sensitivity of the detecting system. When direct light is suspected, the two sets can operate at a differential mode, i.e., the readings of the first set are subtracted from the readings of the second sets, cancelling thereby light which is not reflected light.

Those skilled in the art to which the presently disclosed subject matter pertains will readily appreciate that numerous changes, variations, and modifications can be made without departing from the scope of the invention, mutatis mutandis.

The invention claimed is:

1. A detecting system for detecting distant objects, the system comprising:
   a light source configured to emit light pulses towards a distant object, said light pulses being polarized at a predefined polarization angle;
   a detector configured to detect at least a portion of said light pulses reflected from the distant objects;
   at least one linear polarizer configured for polarizing light at said polarization angle and being so disposed with respect to the detector such that the light reaching said detector passes through the linear polarizer and is polarized at said polarization angle; and,
   a controller configured to selectively determine said polarization angle, in response to saturation of said detector, and to selectively change the polarization angle of said light pulses and said linear polarizer.

2. The detecting system of claim 1 wherein said light pulses are polarized such that when passing through the linear polarizer towards the detector the polarization thereof is maintained.

3. The detecting system of claim 1 wherein said linear polarizer is configured to absorb at least a portion of unpolarized light radiation and light radiation having polarization angle different than said predefined polarization angle.

4. The detecting system of claim 3 wherein said linear polarizer is configured to attenuate unpolarized light radiation and light radiation having polarization angle different than said predefined polarization angle.

5. The detecting system of claim 4 wherein said light pulses define a signal detected by said detector, and light other than said light pulses defines a noise detected by said detector, and wherein said linear polarizer is configured to at least partially filter said other light and to increase a ratio between said signal and said noise.

6. The detecting system of claim 1 wherein said linear polarizer is configured to fully absorb light waves vibrating with respect to a plane orthogonal to said predefined polarization angle and to partially absorb light waves vibrating with respect to planes having an angle larger than 0° and smaller than 90° with respect to said predefined polarization angle.

7. The detecting system of claim 1 wherein said predefined polarization angle is 45° in a first direction with respect to the horizon such that light radiation polarized at an angle of 45° in an opposite direction is completely blocked by said linear polarizer.

8. A method for detecting distant objects, the method comprising:
    transmitting light pulses from a light source towards a distant object, said light pulses being polarized at a predefined polarization angle;
    detecting with a detector at least a portion of said light pulses reflected from the distant objects;
    filtering light entering said detector with at least one linear polarizer configured for polarizing said light at said polarization angle; and
    changing said polarization angle thereof and in response to saturation of said detector.

9. A detecting system for detecting distant objects, the system comprising:
    a first light source configured to emit light pulses towards a distant object, said light pulses being polarized at a first polarization angle;
    a detector configured to detect at least a portion of said light pulses reflected from the distant objects;
    at least one first linear polarizer configured for polarizing light at said first polarization angle and being so disposed with respect to the detector such that the light reaching said detector passes through the first linear polarizer and is polarized at said first polarization angle;
    a second light source configured to emit light pulses polarized at a second polarization angle, wherein a difference between the first polarization angle and the second polarization angle of the second light source is 90°;
    a second linear polarizer configured for polarizing light at said second polarization angle and being so disposed with respect to the detector such that the light reaching said detector passes through the second linear polarizer and is polarized at said second polarization angle; and
    a controller configured to activate said second light source in response to saturation of said detector.

10. The detecting system of claim 9 wherein said controller is configured to detect light pulses reflecting from the distant objects by summing up the detection of said detector and said second detector.

\* \* \* \* \*